United States Patent
Kato et al.

(10) Patent No.: US 10,661,536 B2
(45) Date of Patent: May 26, 2020

(54) RUBBER FORMED ARTICLE AND PROTECTIVE GLOVE

(71) Applicant: ZEON CORPORATION, Tokyo (JP)

(72) Inventors: Shinji Kato, Tokyo (JP); Naohiro Igari, Tokyo (JP); Tetsuya Akabane, Tokyo (JP); Tomoya Taniyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 154 days.

(21) Appl. No.: 15/740,177

(22) PCT Filed: Jul. 1, 2016

(86) PCT No.: PCT/JP2016/069669
§ 371 (c)(1),
(2) Date: Dec. 27, 2017

(87) PCT Pub. No.: WO2017/014029
PCT Pub. Date: Jan. 26, 2017

(65) Prior Publication Data
US 2018/0186128 A1    Jul. 5, 2018

(30) Foreign Application Priority Data
Jul. 22, 2015    (JP) .................................. 2015-144589

(51) Int. Cl.
*B32B 25/16* (2006.01)
*B32B 25/10* (2006.01)
(Continued)

(52) U.S. Cl.
CPC .......... *B32B 25/16* (2013.01); *A41D 19/0055* (2013.01); *A41D 19/0096* (2013.01);
(Continued)

(58) Field of Classification Search
CPC ............ A41D 19/0055; A41D 19/0096; A41D 2500/50; B32B 2307/50; B32B 2437/02;
(Continued)

(56) References Cited

U.S. PATENT DOCUMENTS

| | | |
|---|---|---|
| 2004/0010067 A1 | 1/2004 | Ota et al. |
| 2005/0171272 A1 | 8/2005 | Ota et al. |

(Continued)

FOREIGN PATENT DOCUMENTS

| | | |
|---|---|---|
| CN | 1297602 C | 1/2007 |
| EP | 1 361 247 B1 | 9/2007 |

(Continued)

OTHER PUBLICATIONS

Feb. 22, 2019 Extended Search Report issued in European Patent Application No. 16827593.1.

(Continued)

*Primary Examiner* — Arti Singh-Pandey
(74) *Attorney, Agent, or Firm* — Oliff PLC

(57) ABSTRACT

A rubber formed article includes a laminate in which a rubber layer of nitrile rubber is laminated on a fiber base material. The nitrile rubber contains a copolymer having 52 to 78% by weight of conjugated diene monomer units, 20 to 40% by weight of α,β-ethylenically unsaturated nitrile monomer units, and 2 to 10% by weight of ethylenically unsaturated monocarboxylic acid monomer units. Stress at 50% elongation of the laminate is 20 N or smaller. A ratio of an area where rubber is visible when the laminate is viewed from the back side to an area of the laminate is 15% or less. The thickness of the rubber layer is 0.30 mm or less.

9 Claims, 1 Drawing Sheet

(51) Int. Cl.
*C08F 236/12* (2006.01)
*A41D 19/00* (2006.01)
*D06M 15/263* (2006.01)
*D06M 15/693* (2006.01)
*D06M 15/227* (2006.01)
*D06M 15/31* (2006.01)
*B32B 5/14* (2006.01)

(52) U.S. Cl.
CPC ............. *B32B 5/145* (2013.01); *B32B 25/10* (2013.01); *C08F 236/12* (2013.01); *D06M 15/227* (2013.01); *D06M 15/263* (2013.01); *D06M 15/31* (2013.01); *D06M 15/693* (2013.01); *A41D 2500/50* (2013.01); *B32B 2307/50* (2013.01); *B32B 2437/02* (2013.01); *C08F 2800/20* (2013.01)

(58) Field of Classification Search
CPC ......... B32B 25/10; B32B 25/16; B32B 5/145; C08F 236/12; C08F 2800/20; D06M 15/227; D06M 15/263; D06M 15/31; D06M 15/693
See application file for complete search history.

(56) References Cited

U.S. PATENT DOCUMENTS

| | | |
|---|---|---|
| 2006/0253956 A1 | 11/2006 | Lipinski |
| 2007/0083013 A1 | 4/2007 | Ota et al. |
| 2009/0188019 A1 | 7/2009 | Hassan et al. |
| 2010/0186455 A1 | 7/2010 | Zhu |

FOREIGN PATENT DOCUMENTS

| | | |
|---|---|---|
| JP | 2001-81614 A | 3/2001 |
| JP | 2001-131814 A | 5/2001 |
| JP | 2012-77416 A | 4/2012 |
| JP | 2014-88643 A | 5/2014 |
| WO | 2006/124265 A1 | 11/2006 |

OTHER PUBLICATIONS

Sep. 27, 2016 International Search Report issued in International Patent Application No. PCT/JP2016/069669.

Feb. 13, 2020 Office Action issued in Indian Application No. 201817001606.

Feb. 20, 2020 Office Action issued in European Application No. 16 827 593.1.

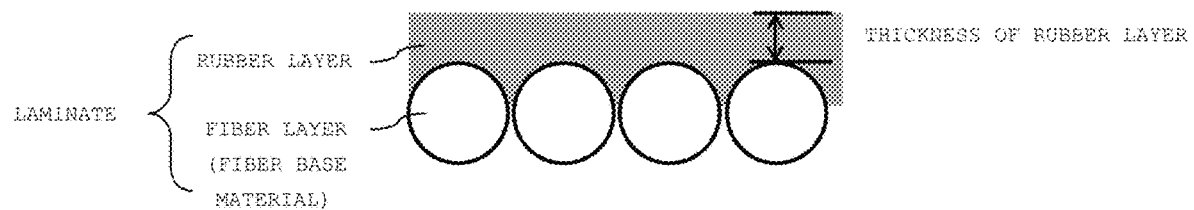

RUBBER FORMED ARTICLE AND PROTECTIVE GLOVE

TECHNICAL FIELD

The present invention relates to a rubber formed article. More specifically, the present invention relates to a rubber formed article suitable for use in a protective glove or the like. The present invention also relates to a protective glove made by using the above-mentioned rubber formed article.

BACKGROUND ART

Conventionally, protective gloves produced by coating fiber gloves with rubber, resin or the like are used as working gloves in various applications such as factory manufacturing work, light work, construction work, and agricultural work.

Various characteristics are required for working gloves depending on the use and purpose, for example, in Patent Literature 1, feeling of steaming during wearing is reduced by forming ventilation holes in a rubber layer coating a fiber glove.

In addition, Patent Literature 2 discloses a working glove produced by coating a fiber glove with a plurality of layers of coating films and thus having permeation resistance to sulfuric acid.

CITATION LIST

Patent Literature

Patent Literature 1: JP 2012-77416 A
Patent Literature 2: JP 2014-88643 A

SUMMARY OF INVENTION

Technical Problem

By the way, in the case where a rubber component penetrates deep into fibers and penetrates to the back side when coating a fiber glove with the rubber layer, the rubber component is caught in the hand when inserting the hand into such a working glove, and the working glove sometimes cannot be worn smoothly. In addition, since the rubber layer coating the fiber glove generally has a certain thickness, there are cases where workability is poor when the glove is worn and further cases where it is difficult to suppress fatigue during working. Thus, gloves with less penetration of rubber component to the back side and a small thickness of the rubber layer are required. However, when the thickness of the rubber layer is made thin, abrasion resistance may be degraded.

An object of the present invention is to provide a rubber formed article which allows smooth insert of a hand at the time of wearing, can suppress fatigue during working, and has excellent workability and excellent abrasion resistance, and a protective glove produced by using this rubber formed article.

As a result of extensive studies to solve the above-mentioned problems, the present inventors have found that the above-mentioned object can be achieved by using a rubber formed article which is obtained by laminating a rubber layer of a nitrile rubber having a predetermined composition on a fiber base material and in which the rubber area having penetrated into the backing and the thickness of the rubber layer are within a predetermined range, and thus have completed the present invention.

That is, according to the present invention, the following are provided:

(1) a rubber formed article including a laminate in which a rubber layer of nitrile rubber is laminated on a fiber base material, in which the nitrile rubber contains a copolymer having 52 to 78% by weight of conjugated diene monomer units, 20 to 40% by weight of α,β-ethylenically unsaturated nitrile monomer units, and 2 to 10% by weight of ethylenically unsaturated monocarboxylic acid monomer units, in which stress at 50% elongation of the laminate is 20 N or smaller, in which a ratio of an area where rubber is visible when the laminate is viewed from a back side of the laminate to an area of the laminate is 15% or less, and in which a thickness of the rubber layer is 0.30 mm or less;

(2) the rubber formed article according to (1), in which the copolymer further contains 0 to 26% by weight of ethylenically unsaturated monomer units;

(3) the rubber formed article according to (1) or (2), in which abrasion resistance of the laminate is level 3 or higher in an abrasion test described in EN388;

(4) the rubber formed article according to any one of (1) to (3), in which the rubber layer has a thickness of 0.05 mm or more and less than 0.20 mm;

(5) the rubber formed article according to any one of (1) to (4), in which abrasion resistance of the laminate is level 4 in an abrasion test described in EN388; and (6) a protective glove using the rubber formed article according to any one of (1) to (5).

Advantageous Effects of Invention

According to the present invention, a rubber formed article which allows smooth insert of a hand at the time of wearing, can suppress fatigue during working, and has excellent workability and excellent abrasion resistance, and a protective glove produced by using this rubber formed article can be provided.

BRIEF DESCRIPTION OF DRAWINGS

FIG. 1 is a schematic diagram showing a method of measuring the thickness of a rubber layer.

DESCRIPTION OF EMBODIMENTS

Hereinafter, a rubber formed article of the present invention will be described. A rubber formed article of the present invention includes a laminate in which a rubber layer of nitrile rubber is laminated on a fiber base material. The nitrile rubber contains a copolymer having 52 to 78% by weight of conjugated diene monomer units, 20 to 40% by weight of α,β-ethylenically unsaturated nitrile monomer units, and 2 to 10% by weight of ethylenically unsaturated monocarboxylic acid monomer units, the stress at 50% elongation of the laminate is 20 N or smaller, the ratio of the area where rubber is visible when the laminate is viewed from the back side to the area of the laminate is 15% or less, and the thickness of the rubber layer is 0.30 mm or less.

Note that, in the laminate, the surface on which the rubber layer is laminated corresponds to the front side, and the surface on which the rubber layer is not laminated corresponds to the back side.

(Laminate)

The rubber formed article of the present invention includes a laminate in which a rubber layer of nitrile rubber is laminated on a fiber base material. Note that, the laminate may be formed on a part or entirety of the rubber formed article.

(Fiber Base Material)

The fiber base material used for the rubber formed article of the present invention is not particularly limited as long as the fiber base material is made of fiber. As the material of the fiber, natural fibers such as cotton, hair, hemp, and wool, and synthetic fibers such as polyester, polyurethane, acryl, and nylon can be used. Among these, nylon is preferably used. In addition, the fiber base material may be knitted fabric, sewn fabric, woven fabric, or nonwoven fabric.

The thickness of the fiber base material is not particularly limited, but is preferably 0.1 to 2.0 mm. The linear density of the fiber base material is not particularly limited, but is preferably 50 to 500 deniers. The gauge number of the fiber base material is not particularly limited, but is preferably 7 to 18 gauge. Here, the gauge number refers to the number of needles of a knitting machine provided in 1 inch.

(Nitrile Rubber)

The nitrile rubber used in the present invention contains a copolymer having 52 to 78% by weight of conjugated diene monomer units, 20 to 40% by weight of $\alpha,\beta$-ethylenically unsaturated nitrile monomer units, and 2 to 10% by weight of ethylenically unsaturated monocarboxylic acid monomer units.

(Conjugated Diene Monomer Unit)

Preferable examples of a conjugated diene monomer forming the conjugated diene monomer unit include conjugated diene monomers having 4 to 6 carbon atoms such as 1,3-butadiene, isoprene, 2,3-dimethyl-1,3-butadiene, 1,3-pentadiene, and chloroprene. Among these, 1,3-butadiene and isoprene are more preferable, and 1,3-butadiene is particularly preferable. The conjugated diene monomer may be used alone or in combination of two or more kinds.

The content of conjugated diene monomer units is 52 to 78% by weight, and preferably 57 to 73% by weight with respect to the total monomer units. If the content of the conjugated diene monomer units is too high, the solvent resistance of the rubber formed article may be inferior. Conversely, if the content is too low, the texture of the rubber formed article may be inferior.

($\alpha,\beta$-Ethylenically Unsaturated Nitrile Monomer Unit)

As the $\alpha,\beta$-ethylenically unsaturated nitrile monomer forming an $\alpha,\beta$-ethylenically unsaturated nitrile monomer unit, an ethylenically unsaturated compound including a nitrile group and having 3 to 18 carbon atoms is used. Examples of such a compound include acrylonitrile, methacrylonitrile, and halogen substituted acrylonitrile. These can be used alone or in combination of two or more. Among these, acrylonitrile is preferably used.

The content of $\alpha,\beta$-ethylenically unsaturated nitrile monomer units is from 20 to 40% by weight, and preferably from 23 to 37% by weight with respect to the total monomer units. If the content of the $\alpha,\beta$-ethylenically unsaturated nitrile monomer units is too high, the texture of the rubber formed article may be inferior. Conversely, if the content is too low, the solvent resistance of the rubber formed article may be inferior.

(Ethylenically Unsaturated Monocarboxylic Acid Monomer Unit)

Examples of the ethylenically unsaturated monocarboxylic acid monomer forming an ethylenically unsaturated monocarboxylic acid monomer unit include acrylic acid, methacrylic acid, ethylacrylic acid, and crotonic acid, and methacrylic acid is preferably used. The content of ethylenically unsaturated monocarboxylic acid monomer units is 2 to 10% by weight, preferably 2 to 8% by weight, and more preferably 3 to 7% by weight with respect to the total monomer units. If the content of the ethylenically unsaturated monocarboxylic acid monomer units is too high, the texture of the rubber formed article may be inferior. Conversely, if the content is too low, the formability of the rubber layer in the rubber formed article may be inferior.

The above-mentioned copolymer may contain other ethylenically unsaturated monomer units different from the conjugated diene monomer units, the $\alpha,\beta$-ethylenically unsaturated nitrile monomer units, and the ethylenically unsaturated monocarboxylic acid monomer units. Other ethylenically unsaturated monomers forming the other ethylenically unsaturated monomer units are not particularly limited as long as the other ethylenically unsaturated monomers are copolymerizable with the conjugated diene monomer, the $\alpha,\beta$-ethylenically unsaturated nitrile monomer, or the ethylenically unsaturated monocarboxylic acid monomer, and examples thereof include the following monomers.

Examples of the other ethylenically unsaturated monomers include ethylenically unsaturated polyvalent carboxylic acids and anhydrides thereof such as maleic acid, maleic anhydride, fumaric acid, itaconic acid, itaconic anhydride, citraconic acid, and mesaconic acid; monoalkyl esters of ethylenically unsaturated monocarboxylic acids such as methyl acrylate, methyl methacrylate, ethyl acrylate, propyl acrylate, butyl acrylate, ethyl methacrylate, and amyl acrylate; polyvalent alkyl esters of ethylenically unsaturated polyvalent carboxylic acids such as diethyl maleate, dimethyl itaconate, and dimethyl maleate; partial alkyl esters of ethylenically unsaturated polyvalent carboxylic acids such as monoethyl maleate, monomethyl itaconate, and monomethyl maleate; monoamides of ethylenically unsaturated monocarboxylic acids such as acrylamide, methacrylamide, crotonic acid amide, and cinnamic acid amide; aromatic vinyl monomers such as styrene, $\alpha$-methylstyrene, o-methylstyrene, m-methylstyrene, p-methylstyrene, p-t-butylstyrene, o-methoxystyrene, o-chlorostyrene, m-chlorostyrene, p-chlorostyrene, 1,1-diphenylethylene, N,N-dimethyl-p-aminostyrene, and vinylpyridine; and vinyl chloride, vinylidene chloride, vinyl acetate, and allyl acetate. The content of the other ethylenically unsaturated monomer units is 0 to 26% by weight, and preferably 0 to 15% by weight with respect to the total monomer units, and it is more preferable that any other ethylenically unsaturated monomer unit is not contained.

The copolymer used in the present invention can be easily produced by emulsion polymerization of a mixture of the monomers described above. In the present invention, a latex of the copolymer obtained by emulsion polymerization can be used as a latex for dip forming. By adjusting the composition of the monomer mixture used for emulsion polymerization, the composition of the obtained copolymer can be easily adjusted. As the emulsion polymerization method, a conventionally known emulsion polymerization method may be adopted. The constitutional ratio of the monomer units constituting the copolymer is almost the same as the constitutional ratio of the respective monomers constituting a monomer composition used for the polymerization. In addition, in the emulsion polymerization, commonly used polymerization auxiliary materials such as emulsifiers, polymerization initiators, and molecular weight regulators can be used.

The emulsifiers are not particularly limited, and examples thereof include anionic surfactant, nonionic surfactant, cationic surfactant and amphoteric surfactant. Among these, anionic surfactants such as alkylbenzene sulfonate, aliphatic sulfonate, sulfate ester of higher alcohol, α-olefin sulfonate, alkyl ether sulfate and the like can be preferably used. The amount of the emulsifier to be used is preferably 0.5 to 10 parts by weight and more preferably 1 to 8 parts by weight with respect to 100 parts by weight of the total monomers.

Although the polymerization initiator is not particularly limited, a radical initiator can be preferably used. Examples of such a radical initiator include inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyrylperoxide, octanoyl peroxide, dibenzoyl peroxide, 3,5,5-trimethyl-hexanoyl peroxide, and t-butyl peroxyisobutyrate; azo compounds such as azobisisobutyronitrile, azobis-2,4-dimethyl-valeronitrile, azobiscyclohexanecarbonitrile, and azobis (isobutyric acid methyl). These polymerization initiators can be used alone or in combination of two or more. Among these radical initiators, inorganic or organic peroxides can be preferably used, inorganic peroxides can be more preferably used, and persulfates can be particularly preferably used. The amount of the polymerization initiator to be used is preferably 0.01 to 2 parts by weight, and more preferably 0.05 to 1.5 parts by weight with respect to 100 parts by weight of the total monomers contained in the monomer composition.

The molecular weight regulator is not particularly limited, and examples thereof include α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. These can be used alone or in combination of two or more. Among these, mercaptans are preferable, and t-dodecyl mercaptan can be used more preferably. The amount of the molecular weight regulator to be used varies depending on the type thereof, but is preferably 0.1 to 1.5 parts by weight, and more preferably 0.2 to 1.0 parts by weight with respect to 100 parts by weight of the total monomers contained in the monomer composition.

Emulsion polymerization is usually carried out in water. The amount of water to be used is preferably 80 to 500 parts by weight and more preferably 100 to 200 parts by weight with respect to 100 parts by weight of the total monomers contained in the monomer composition.

In the emulsion polymerization, if necessary, a polymerization auxiliary material other than the above described one may be additionally used. Examples of such polymerization auxiliary material include a chelating agent, a dispersing agent, a pH adjusting agent, a deoxidizing agent, and a particle diameter adjusting agent, and the type and amount of use thereof are not particularly limited.

The polymerization temperature is not particularly limited, but is normally 0 to 95° C. and preferably 5 to 70° C. After the polymerization reaction is stopped by adding a polymerization inhibitor, unreacted monomers are removed and the solid content concentration and the pH are adjusted as desired, and thus the latex for dip forming to be used in the present invention can be obtained. The polymerization conversion rate when the polymerization reaction is stopped is usually 80% by weight or more, and preferably 90% by weight or more.

The weight average particle diameter of copolymer particles contained in the latex for dip forming used in the present invention is usually 30 to 1000 nm, preferably 50 to 500 nm, and more preferably 70 to 200 nm. By setting the particle diameter to the lower limit or larger, the latex viscosity does not become too high and handling becomes easy. Further, by setting the particle diameter to the upper limit or smaller, the film formability at the time of dip forming can be improved, and a rubber formed article having a uniform film thickness can be easily obtained.

The total solid content concentration of the latex for dip forming used in the present invention is usually 20 to 65% by weight, preferably 30 to 60% by weight, and more preferably 35 to 55% by weight. By setting this concentration to the lower limit or higher, the transport efficiency of the latex can be improved. Also, by setting the concentration to the upper limit or lower, a phenomenon that the production becomes difficult, handling of the latex becomes difficult because of excessively high viscosity can be suppressed.

The pH of the latex for dip forming used in the present invention is usually 5 to 13. By setting the pH of the latex to the lower limit or higher, the mechanical stability can be improved, and a problem that coarse aggregates are liable to be generated at the time of transferring the latex can be suppressed. Also, by setting the pH of the latex to the upper limit or lower, a phenomenon that handling of the latex becomes difficult because of excessively high viscosity can be suppressed.

Various additives such as an anti-aging agent, an antioxidant, an antiseptic, an antibacterial agent, a thickening agent, a dispersing agent, a pigment, and a dye, which are usually added to a latex, may be added, if desired, in a predetermined amount, to the latex for dip forming used in the present invention.

(Latex Composition for Dip Forming)

The rubber formed article of the present invention is obtained by performing dip forming using the fiber base material and a latex composition for dip forming containing the latex for dip forming. Here, the latex composition for dip forming is obtained by adding a crosslinking agent, a crosslinking accelerator, zinc oxide, a viscosity adjusting agent, and the like to the latex for dip forming. By adding a crosslinking agent, a composition capable of dip forming can be obtained.

As the crosslinking agent, a sulfur-based crosslinking agent is preferably used. Examples of the sulfur-based crosslinking agent include sulfur such as powdered sulfur, sulfur flower, precipitating sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, and polymer polysulfide; and sulfur-donating compounds such as tetramethylthiuram disulfide, selenium dimethyldithiocarbamate, and 2-(4'-morpholinodithio)benzothiazole. These may be used singly or in combination of plural kinds.

The amount of the sulfur-based crosslinking agent to be added is preferably 0.01 to 5 parts by weight, more preferably 0.05 to 3 parts by weight, and particularly preferably 0.1 to 2 parts by weight with respect to 100 parts by weight of the total solid content in the latex for dip forming. By setting the amount of the sulfur-based crosslinking agent to be added to the lower limit or more, the texture of the rubber formed article can be improved. By setting the amount of the sulfur-based crosslinking agent to be added to the upper limit or less, the solvent resistance of the rubber formed article can be improved.

The sulfur-based crosslinking agent is preferably added as an aqueous dispersion in which the sulfur-based crosslinking agent is dispersed in water. By adding the sulfur-based crosslinking agent as an aqueous dispersion, a rubber formed article such as a glove having high abrasion resistance can be obtained.

The method of preparing the dispersion of the sulfur-based crosslinking agent is not particularly limited, and a method in which a solvent is added to the sulfur-based crosslinking agent, and then pulverized and stirred with a wet pulverizer such as a ball mill or a bead mill is preferable.

When sulfur is used as a sulfur-based crosslinking agent, it is preferable to incorporate a crosslinking accelerator (vulcanization accelerator) or zinc oxide.

As the crosslinking accelerator (vulcanization accelerator), those commonly used in dip forming can be used. Examples of the crosslinking accelerator include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid and zinc salts thereof; and 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbaylthio)benzothiazole, 2-(2,6-dimethyl-4-morpholinothio) benzothiazole, 2-(4'-morpholino-dithio)benzothiazole, 4-morpholinyl-2-benzothiazyl disulfide, and 1,3-bis(2-benzothiazyl-mercaptomethyl) urea, and zinc diethyldithiocarbamate, zinc dibutyldithiocarbamate, 2-mercaptobenzothiazole, and zinc 2-mercaptobenzothiazole are preferable. These crosslinking accelerators may be used alone or in combination of two or more kinds. The amount of the crosslinking accelerator to be used is 0.1 to 10 parts by weight, preferably 0.5 to 5 parts by weight with respect to 100 parts by weight of the total solid content in the latex for dip forming.

In addition, the amount of zinc oxide to be used is 5 parts by weight or less, preferably 0.1 to 3 parts by weight, and more preferably 0.5 to 2 parts by weight with respect to 100 parts by weight of the total solid content in the latex for dip forming.

Various additives such as a viscosity adjusting agent, an anti-aging agent, an antioxidant, an antiseptic, an antibacterial agent, a wetting agent, a dispersing agent, a pigment, a dye, a filler, a reinforcing material, and a pH adjusting agent may be added, if necessary, in a predetermined amount, to the latex composition for dip forming used in the present invention.

The viscosity of the latex composition for dip forming is preferably 500 to 8,000 mPa·s, and more preferably 2,500 to 7,000 mPa·s.

The solid content concentration of the latex composition for dip forming is preferably 5 to 50% by weight, and more preferably 10 to 40% by weight.

(Aging)

The latex composition for dip forming used in the present invention may be subjected to aging (also referred to as pre-vulcanization) before being subjected to dip forming.

In the case of using a sulfur-based crosslinking agent as the crosslinking agent, the temperature condition for aging is preferably 20 to 50° C. In addition, the time for aging is preferably 6 hours or longer and more preferably 12 hours or longer from the viewpoint of obtaining a rubber formed article such as a glove having high abrasion resistance. By setting the aging time to the lower limit or longer, the abrasion resistance of the obtained rubber formed article can be improved.

(Rubber Formed Article)

The rubber formed article of the present invention is obtained by performing dip forming of the latex composition for dip forming described above. As a dip forming method, a conventionally known method can be adopted, and examples thereof include a direct dipping method, an anode coagulant dipping method, and a Teague coagulant dipping method. Among these, the anode coagulant dipping method is preferable in that a rubber formed article having a uniform thickness can be easily obtained. Hereinafter, a dip forming method by an anode coagulant dipping method as one embodiment will be described.

First, a dip forming mold covered with a fiber base material is immersed in a coagulating agent solution to let the coagulating agent attach to the surface of the fiber base material covering the dip forming mold.

As the dip forming mold, various materials such as porcelain, glass, metal, and plastic can be used. The shape of the mold may be adapted to the shape of the rubber formed article as a final product. For example, when the rubber formed article is a glove, various shapes such as a shape from the wrist to the fingertip, and a shape from the elbow to the fingertip can be adopted as the shape of the dip forming mold. In addition, the surface of the dip forming mold may be entirely or partially subjected to surface processing such as gloss processing, semi-gloss processing, non-gloss processing, and weaving pattern processing.

The coagulating agent solution is a solution in which a coagulating agent capable of coagulating latex particles is dissolved in water, alcohol or a mixture thereof. Examples of the coagulating agent include metal halide salts, nitrates, and sulfates.

Next, the dip forming mold to which the coagulating agent has been attached is immersed in the latex composition for dip forming, and then the dip forming mold is pulled up to form a rubber layer of nitrile rubber as a dip-formed layer on the surface of the fiber base material. In addition, the time for immersing the dip forming mold in the latex composition for dip forming is preferably 1.0 to 120 seconds and more preferably 1 to 20 seconds.

After that, the layer of nitrile rubber as the dip-formed layer formed on the dip forming mold is heated to crosslink the copolymer constituting the dip-formed layer.

The heating temperature for crosslinking is preferably 60 to 160° C., and more preferably 80 to 150° C. By setting the heating temperature to the lower limit or higher, the time required for the crosslinking reaction is a predetermined time, and thus the productivity can be improved. In addition, by setting the heating temperature to the upper limit or lower, oxidative degradation of the copolymer is suppressed, and thus the physical properties of the formed article can be improved. The time of the heat treatment may be appropriately selected according to the heat treatment temperature, but is usually 5 to 120 minutes.

In the present invention, before performing heat treatment on the dip-formed layer, the dip-formed layer is preferably immersed in warm water at 20 to 80° C. for about 0.5 to 60 minutes to remove water-soluble impurities (emulsifier, water-soluble polymer, coagulating agent, etc.).

Subsequently, the fiber base material including the dip-formed layer crosslinked by heat treatment is detached from the dip forming mold to obtain the rubber formed article.

After the rubber formed article is detached from the dip forming mold, heat treatment (post-crosslinking step) may be further performed at a temperature of 60 to 120° C. for 10 to 120 minutes. Further, a surface treatment layer may be formed on the inner and/or outer surfaces of the rubber formed article by chlorination treatment, coating treatment, or the like.

In the rubber formed article of the present invention, the abrasion resistance of the laminate is preferably level 3 or higher and more preferably level 4 or higher in the case where an abrasion test based on a test method described in European standard EN388 is conducted. If the abrasion resistance is the above limit or higher, excellent abrasion resistance can be obtained and occurrence of breakage during working can be suppressed.

In addition, in the rubber formed article of the present invention, the stress at 50% elongation of the laminate is 20 N or smaller and preferably 17 N or smaller. If the stress at 50% elongation of a portion at which the rubber layer of nitrile rubber is laminated is too large, it becomes difficult to suppress fatigue during working when used as a glove. Note that, the lower limit of the maximum stress is not particularly limited, but is usually about 1.0 N.

In addition, in the rubber formed article of the present invention, the ratio of the area where rubber constituting the rubber layer is visible as viewed from the back side of the laminate to the area of the laminate is 15% or less and preferably 10% or less. If the area of rubber visible from the back side of the rubber formed article is too large, when the rubber formed article is used as a glove, the hand becomes likely to be caught at the time of wearing, and it becomes hard to wear the glove smoothly.

In addition, in the rubber formed article of the present invention, the thickness of the rubber layer constituting the laminate is 0.30 mm or less, and preferably 0.05 mm or more and less than 0.20 mm. If the thickness of the rubber layer is too large, the stress increases, and it becomes difficult to suppress fatigue during working when the rubber formed article is used as a glove.

The rubber formed article of the present invention allows smooth insert of a hand at the time of wearing, can suppress fatigue during working, and has excellent workability and excellent abrasion resistance. Therefore, the rubber formed article of the present invention can be suitably used for working gloves, particularly protective gloves for domestic, agricultural, fishery, and industrial use and the like.

EXAMPLES

Hereinafter, the present invention will be specifically described with reference to Examples and Comparative Examples. In these examples, "parts" and "%" are on a weight basis unless otherwise specified. However, the present invention is not limited to only these examples.

Measurement and evaluations in Examples and Comparative Examples were carried out as follows.

<Method of Measuring Viscosity of Latex Composition for Dip Forming>

The viscosities of latex compositions for dip forming prepared in Examples and Comparative Examples were measured with a B-type viscometer (manufactured by Brookfield) using a rotor No. 3 at a temperature of 25° C. and a rotation speed of 6 rpm.

<Stress at 50% Elongation of Laminate>

The stress at 50% elongation of the laminate was measured by the following procedure. First, dumbbell-shaped test pieces of the protective gloves produced in Examples and Comparative Examples were prepared by using a dumbbell (Die-C: manufactured by Dumbbell Co., Ltd.) in accordance with ASTM D-412. Next, these test pieces were pulled at a pulling rate of 500 mm/min using a universal testing machine (3343: manufactured by INSTRON) and the stress at 50% elongation was measured. The results are shown in Table 1.

<Rubber Area Ratio of Backing>

A rubber area ratio of the backing was obtained by turning the protective gloves produced in Examples and Comparative Examples inside out, visually observing the protective gloves from the side of the fiber base material as the backing, and obtaining the area of a portion where a rubber component constituting the rubber layer that has penetrated therethrough and has been solidified with respect to the area of the laminate as a ratio.

Specific procedures are described below.

(1) A photograph of the side of the fiber base material as the backing was taken.

(2) The portion where the rubber constituting the rubber layer is visible and a portion where fibers are visible were respectively copied on different grid paper sheets.

(3) The portions copied on the grid paper sheets were respectively cut out, and the area ratio was calculated from the weight ratio of the cut grid paper sheets.

Note that, a case where rubber can be seen through the fibers is not included in the "area where rubber is visible" of the present invention. The obtained rubber area ratios are shown in the range of 10% increments. The results are shown in Table 1.

<Thickness of Rubber Layer>

With respect to protective gloves produced in Examples and Comparative Examples, the thickness of the rubber layer was measured with an optical microscope. Specifically, a cross section of a rubber layer laminated on a palm portion at 12 cm from the tip of the middle finger of a protective glove as a sample was observed using an optical microscope (VHX-200, manufactured by Keyence Corporation).

As shown in FIG. 1, the thickness of the rubber layer was obtained by measuring the distance from the highest portion of the fiber base material constituting the laminate to the top surface of the laminated rubber layer at ten points and calculating the number average value. The results are shown in Table 1.

<Insertability of Hand at Time of Wearing>

Insertability of the hand at the time of wearing the protective gloves was evaluated by conducting a questionnaire on whether or not the protective gloves produced in Example and Comparative Example were smoothly worn on the hand after conducting experiments of actually wearing the protective gloves on the hand. Note that, if the rubber area ratio of the backing is high, the hand gets caught at the time of wearing the protective glove and it is difficult to smoothly wearing the protective glove. The evaluation was carried out for 10 people, and a case where three or more people felt that the hand was caught when being inserted was evaluated as "poor", and a case of less than three people was evaluated as "excellent". The results are shown in Table 1.

<Abrasion Test>

With regard to an abrasion test, evaluation was performed by using a Martindale abrasion tester (STM633, manufactured by SATRA) in accordance with the method described in EN388. Specifically, the laminates of the protective gloves produced in Examples and Comparative Examples were repeatedly rubbed while applying a predetermined load, and thus the number of times of rubbing until breakage was obtained. Classification into levels from level 0 to level 4 was performed in accordance with the number of rubbing until breakage, and a higher level indicates a higher abrasion resistance. The results are shown in Table 1.

<Degree of Fatigue During Wearing>

A degree of fatigue during wearing was evaluated by conducting a questionnaire about the feeling of fatigue felt in the hands after actually wearing the protective gloves produced in Examples and the Comparative Examples on the hands and carrying out light work such as cleaning and transportation. The evaluation was carried out for 10 people, and a case where three or more people felt fatigue in the hands was evaluated as "poor", and a case of less than three people was evaluated as "excellent". The results are shown in Table 1.

Example 1

(Production of Latex for Dip Forming)

In a polymerization reactor, 65 parts of 1,3-butadiene (hereinafter occasionally referred to as "BD") as a conjugated diene monomer, 30 parts of acrylonitrile (hereinafter occasionally referred to as "AN") as an α,β-ethylenically unsaturated nitrile monomer, 5 parts of methacrylic acid (hereinafter occasionally referred to as "MAA") as an ethylenically unsaturated monocarboxylic acid monomer, 0.4 parts of t-dodecyl mercaptan, 132 parts of ion exchanged water, 3 parts of sodium dodecylbenzenesulfonate, 0.5 parts of sodium salt of β-naphthalene sulfonic acid formalin condensate, 0.3 parts of potassium persulfate, and 0.05 parts of sodium salt of ethylenediamine tetraacetate were added, polymerization was performed by maintaining the polymerization temperature at 30 to 40° C., and the reaction was continued until the polymerization conversion rate reached 94%.

After removal of unreacted monomers from the obtained copolymer latex, the pH and the solid content concentration of the copolymer latex were adjusted to obtain a latex for dip forming according to Example 1 having a solid content concentration of 40% and a pH of 8.

(Preparation of Compounding Agent Dispersion)

A sulfur dispersion having a solid content concentration of 50% by weight was obtained by grinding and stirring 1.0 part of colloidal sulfur (manufactured by Hosoi Chemical Industry Co., Ltd.), 0.5 parts of a dispersing agent (DEMOL N manufactured by Kao Corporation), 0.0015 parts of 5% potassium hydroxide (manufactured by Wako Pure Chemical Industries, Ltd.), and 1.0 part of water in a ball mill for 48 hours.

Aqueous dispersions in which zinc dibutyldithiocarbamate (manufactured by Ouchi Shinko Chemical Industrial Co., Ltd., hereinafter referred to as "ZnDBC" in some cases) and zinc oxide (manufactured by Seido Chemical Industry Co., Ltd.) were used instead of the colloidal sulfur were prepared in the same manner.

(Preparation of Latex Composition for Dip Forming)

A 10% ammonia aqueous solution was added to the above latex for dip forming to adjust the pH to 9.5. In addition, aqueous dispersions of respective compounding agents were added thereto such that the content of colloidal sulfur (added as the above-mentioned sulfur dispersion liquid) was 1.5 parts, the content of ZnDBC was 0.8 parts, and the content of zinc oxide was 2.0 parts in terms of solid content with respect to 100 parts of the copolymer in the latex for dip forming. Note that, at the time of addition, while stirring the latex, a predetermined amount of the aqueous dispersion of each compounding agent was gradually added. After uniformly mixing the additives, Aron (manufactured by Toagosei Co., Ltd.) was added as a viscosity adjusting agent to adjust the viscosity of the composition to 4,000 mPa·s, and thus a latex composition for dip forming was obtained.

(Production of Rubber Formed Article (Protective Glove))

Using the above latex composition for dip forming, a rubber formed article (protective glove) was produced by the following method.

First, a ceramic hand mold covered with a fiber glove (material: nylon, linear density: 300 deniers, gauge number: 13 gauge, thickness: 0.8 mm) was immersed in a coagulating agent solution consisting of a 5% calcium nitrate methanol solution for 10 seconds, pulled up, and then dried at 30° C. for 1 minute to cause the coagulating agent to attach to the fiber glove. Thereafter, the glove mold to which the coagulating agent has been attached was immersed in the above latex composition for dip forming for 10 seconds, pulled up, dried at 30° C. for 5 minutes, and then dried at 70° C. for 10 minutes. Subsequently, the glove mold was immersed in warm water of 60° C. for 90 seconds to elute water-soluble impurities, and then dried again at 30° C. for 10 minutes. The dip-formed layer was subjected to crosslinking treatment by performing heat treatment at 125° C. for 30 minutes.

Next, the crosslinked rubber formed article was detached from the glove mold to obtain a protective glove in which nitrile rubber is laminated on the fiber base material.

Example 2

Production of the latex for dip forming and preparation of the latex composition for dip forming were carried out in the same manner as in Example 1 except that the amount of 1,3-butadiene was changed to 67 parts, the amount of acrylonitrile was changed to 25 parts, and further the amount of methacrylic acid was changed to 8 parts in the production of the latex for dip forming. A rubber formed article (protective glove) was produced in the same manner as in Example 1 except that the latex composition for dip forming thus obtained was used.

Example 3

Production of the latex for dip forming and preparation of the latex composition for dip forming were carried out in the same manner as in Example 1 except that the amount of 1,3-butadiene was changed to 61 parts, the amount of acrylonitrile was changed to 35 parts, and further the amount of methacrylic acid was changed to 4 parts in the production of the latex for dip forming. A rubber formed article (protective glove) was produced in the same manner as in Example 1 except that the latex composition for dip forming thus obtained was used.

Example 4

A rubber formed article (protective glove) was produced in the same manner as in Example 1 except that the time for immersing in the latex composition for dip forming was changed to 20 seconds.

Comparative Example 1

Production of the latex for dip forming and preparation of the latex composition for dip forming were carried out in the same manner as in Example 1 except that the amount of 1,3-butadiene was changed to 48 parts, and the amount of acrylonitrile was changed to 47 parts in the production of the latex for dip forming. A rubber formed article (protective glove) was produced in the same manner as in Example 1 except that the latex composition for dip forming thus obtained was used.

Comparative Example 2

Production of the latex for dip forming and preparation of the latex composition for dip forming were carried out in the same manner as in Example 1 except that the amount of 1,3-butadiene was changed to 80 parts, and the amount of acrylonitrile was changed to 15 parts in the production of the latex for dip forming. A rubber formed article (protective glove) was produced in the same manner as in Example 1 except that the latex composition for dip forming thus obtained was used.

Comparative Example 3

The latex composition for dip forming was prepared in the same manner as in Example 1 except that the viscosity of the latex composition for dip forming was set to 2,000 mPa·s by reducing the amount of the viscosity adjusting agent. A rubber formed article (protective glove) was produced in the same manner as in Example 1 except that the latex composition for dip forming thus obtained was used and the time for immersing in the latex composition for dip forming was changed to 30 seconds.

Comparative Example 4

The latex composition for dip forming was prepared in the same manner as in Example 1 except that the viscosity of the latex composition for dip forming was set to 8,000 mPa·s by increasing the amount of the viscosity adjusting agent. A rubber formed article (protective glove) was produced in the same manner as in Example 1 except that the latex composition for dip forming thus obtained was used.

units), 20 to 40% by weight of α,β-ethylenically unsaturated nitrile monomer units (acrylonitrile units), and 2 to 10% by weight of ethylenically unsaturated monocarboxylic acid monomer units (methacrylic acid units), the stress at 50% elongation of the laminate is 20 N or smaller, the ratio of the area where rubber is visible when the laminate is viewed from the back side to the area of the laminate is 15% or lower, and the thickness of the rubber layer is 0.30 mm or less is excellent in insertability of the hand at the time of wearing, can suppress fatigue during working (has low stress), and is excellent in abrasion resistance (Examples 1 to 4).

Meanwhile, in the case where 1,3-butadiene was less than the above range and acrylonitrile was more than the above range in the composition of monomers constituting the copolymer, the stress at 50% elongation was high, and thus fatigue during working could not be suppressed (Comparative Example 1).

In addition, in the case where 1,3-butadiene was more than the above range and acrylonitrile was less than the above range in the composition of monomers constituting the copolymer, the abrasion resistance was inferior (Comparative Example 2).

In addition, in the case where the rubber area ratio of the backing was high, a catch was felt when inserting the hand into the protective glove and the insertability of the hand at the time of wearing was inferior (Comparative Example 3).

In addition, in the case where the thickness of the rubber layer was large, the stress at 50% elongation was high, and thus fatigue during working could not be suppressed (Comparative Example 4).

The invention claimed is:
1. A rubber formed article comprising a laminate in which a rubber layer of nitrile rubber is laminated on a fiber base material,

TABLE 1

| | | Unit | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|---|
| Protective glove | Composition of rubber (BD/AN/MAA) | Part | 65/30/5 | 67/25/8 | 61/35/4 | 65/30/5 | 48/47/5 | 80/15/5 | 65/30/5 | 65/30/5 |
| | Stress at 50% elongation | N | 7.3 | 8.8 | 13.6 | 14.6 | 31.2 | 11.3 | 18.7 | 26.3 |
| | Rubber area ratio of backing | % | 0~10 | 0~10 | 0~10 | 0~10 | 0~10 | 0~10 | 30~40 | 0~10 |
| | Thickness of rubber layer | mm | 0.085 | 0.128 | 0.163 | 0.173 | 0.183 | 0.172 | 0.165 | 0.318 |
| Items of evaluation | Insertability of hand at time of wearing | — | Excellent | Excellent | Excellent | Excellent | Excellent | Excellent | Poor | Excellent |
| | Abrasion test (EN388) | Level | 4 | 4 | 4 | 4 | 3 | 2 | 4 | 4 |
| | Fatigue during wearing | — | Excellent | Excellent | Excellent | Excellent | Poor | Excellent | Poor | Poor |
| | Note | | | | | | When the composition is out of the range, the stress increases, and fatigue is caused. | When the composition is out of the range, abrasion test is inferior. | When the rubber area rate of the backing is high, a catch is felt at the time of inserting the hand. | When the thickness of the rubber layer is large, the stress increases, and fatigue is caused. |

As shown in Table 1, a rubber formed article (protective glove) that is a rubber formed article in which a rubber layer of nitrile rubber is laminated on a fiber base material, the nitrile rubber contains a copolymer having 52 to 78% by weight of conjugated diene monomer units (1,3-butadiene wherein a linear density of the fiber base material is 50 to 500 deniers, wherein the nitrile rubber contains a copolymer having 52 to 78% by weight of conjugated diene monomer units, 20 to 40% by weight of α,β-ethylenically unsaturated nitrile monomer units, and 2 to 10% by weight of ethylenically unsaturated monocarboxylic acid monomer units, wherein stress at 50% elongation of the laminate is 20 N or smaller, wherein a ratio of an area where rubber is visible when the laminate is viewed from a back side of the laminate to an area of the laminate is 15% or less, and wherein a thickness of the rubber layer is 0.30 mm or less.

2. The rubber formed article according to claim 1, wherein the copolymer further contains 0 to 26% by weight of other ethylenically unsaturated monomer units.

3. The rubber formed article according to claim 1, wherein abrasion resistance of the laminate is level 3 or higher in an abrasion test described in EN388.

4. The rubber formed article according to claim 1, wherein the rubber layer has a thickness of 0.05 mm or more and less than 0.20 mm.

5. The rubber formed article according to claim 1, wherein abrasion resistance of the laminate is level 4 in an abrasion test described in EN388.

6. A protective glove made from the rubber formed article according to claim 1.

7. The rubber formed article according to claim 1, wherein the copolymer has 57 to 73% by weight of conjugated diene monomer units, 23 to 37% by weight of α,β-ethylenically unsaturated nitrile monomer units, and 2 to 8% by weight of ethylenically unsaturated monocarboxylic acid monomer units.

8. The rubber formed article according to claim 1, wherein the stress at 50% elongation of the laminate is 17 N or smaller.

9. The rubber formed article according to claim 1, wherein the ratio of an area where rubber is visible when the laminate is viewed from a back side of the laminate to an area of the laminate is 10% or less.

* * * * *